(12) United States Patent
Schreiber et al.

(10) Patent No.: US 8,153,241 B2
(45) Date of Patent: Apr. 10, 2012

(54) WIDE-ANGLE HIGHLY REFLECTIVE MIRRORS AT 193NM

(75) Inventors: Horst Schreiber, Rochester, NY (US); Charlene Marie Smith, Corning, NY (US); Jue Wang, Fairport, NY (US)

(73) Assignee: Corning Incorporated, Corning, NY (US)

( * ) Notice: Subject to any disclaimer, the term of this patent is extended or adjusted under 35 U.S.C. 154(b) by 372 days.

(21) Appl. No.: 12/393,287

(22) Filed: Feb. 26, 2009

(65) Prior Publication Data

US 2010/0215932 A1    Aug. 26, 2010

(51) Int. Cl.
*G02B 1/08* (2006.01)
*B32B 15/00* (2006.01)

(52) U.S. Cl. ... 428/216; 428/432; 428/701; 359/485.07; 359/582

(58) Field of Classification Search .......... 428/212–213, 428/216, 220, 411.1, 336, 432, 428, 576, 428/688–689, 697, 699–702; 359/483.01, 359/485.01–485.07, 489.01–489.13, 511, 359/514, 577, 580–590, 838, 871, 883–884; 501/108–120
See application file for complete search history.

(56) References Cited

U.S. PATENT DOCUMENTS

| 5,981,075 A | * | 11/1999 | Ohmi et al. | 428/428 |
| 6,030,717 A | * | 2/2000 | Nakamura et al. | 428/699 |
| 7,465,681 B2 | | 12/2008 | Hart et al. | |
| 2006/0137397 A1 | * | 6/2006 | Bookbinder et al. | 65/17.3 |
| 2008/0050910 A1 | | 2/2008 | Hart et al. | |
| 2008/0204862 A1 | | 8/2008 | Wang et al. | |

FOREIGN PATENT DOCUMENTS

JP    2002-348117 A    * 12/2002

OTHER PUBLICATIONS

Burnett et al. "High-Index Materials for 193 nm Immersion Lithography". Presented at 2nd International Symposium on Immersion Lithography, Bruges, Belgium Sep. 15, 2005.*
Schott Lithotec. "Calcium Fluoride: VUV/DUV/UV, Vis & IR applications". Jun. 2006.*
Translation of JP 2002-348117, Retrieved May 18, 2011.*
Lee et al.; "Characterization of ALF3 Thin Films at 193NM by Thermal Evaporation"; Applied Optics; vol. 44, No. 34; Dec. 2005; pp. 7333-7338.
Wang et al.; "Crystal Phase Transition of HFO2 Films Evaporated by Plasma-Ion-Assisted Deposition"; Applied Optics; vol. 47, No. 13; May 2008; pp. C189-C192.
Wang et al.; "Extended Lifetime of Fluoride Optics"; Proc. of SPIE; vol. 6720; pp. 67200I-1-67200I-9.

(Continued)

*Primary Examiner* — Callie Shosho
*Assistant Examiner* — Prashant J Khatri
(74) *Attorney, Agent, or Firm* — Walter M. Douglas (57) ABSTRACT

The invention is directed to highly reflective optical elements having an amorphous $MgAl_2O_4$–$SiO_2$ coating with fluoride enhancements inserted and sealed by dense smooth $SiO_2$ layers, and to a method for preparing such elements using energetic deposition techniques and the spinel crystalline form of $MgAl_2O_4$ as the source of the amorphous $MgAl_2O_4$ coating, The coating and the method described herein can be used to make highly reflective mirrors, and can also be applied to beamsplitters, prisms, lenses, output couplers and similar elements used in <200 nm laser systems.

15 Claims, 7 Drawing Sheets

OTHER PUBLICATIONS

Karl H. Guenther; "Microstructure of Vapor-Deposited Optical Coatings"; Applied Optics; vol. 23, No. 21; Nov. 1984; pp. 3806-3816.

Wang et al.; "Nanoporous Structure of a GDF3 Thin Film Evaluated by Variable Angle Spectroscopic Ellipsometry"; Applied Optics; vol. 46, No. 16; Jun. 2007; pp. 3221-3226.

Murata et al; "Preparation of HIHG-Performance Optical Coatings With Fluoride Nanoparticle Films Made From Autoclaved Sols"; Applied Optics; vol. 45, No. 7; Mar. 2006; pp. 1465-1468.

Wang et al; "Scratch-Resistant Improvement of Sol-Gel Derived Nano-Porous Silica Films"; Journal of Sol-Gel Science and Technology; vol. 18; 2000; pp. 219-224.

Wang et al; "Structural Comparison of GDF3 Films Grown on CAF2 (111) and SIO2 Substrates"; Applied Optics; vol. 47, No. 23; Aug. 2008; pp. 4292-4296.

Ristau et al; "Ultraviolet Optical and Microstructural Properties of MGF2 and LAF3 Coatings Deposited by Ion-Beam Sputtering and Boat and Electron-Beam Evaporation"; Applied Optics; vol. 42, No. 16; Jun. 2002; pp. 3196-3204.

Wang et al.; "Wavefront Control of SIO2-Based Ultraviolet Narrow-Bandpass Filters Prepared by Plasma Ion-Assisted Deposition"; Applied Optics; vol. 46, No. 2; Jan. 2007; pp. 175-179.

\* cited by examiner

WIDE-ANGLE HIGHLY REFLECTIVE MIRRORS AT 193NM

FIELD

The invention is directed to wide-angle, highly reflective mirrors that can be used in below 200 nm laser systems and to a method for making such mirrors.

BACKGROUND

Below 200 nm lasers such as ArF excimer lasers are the illumination sources of choice for the microlithographic industry. The industry constantly demands more performance from excimer laser sources. As a result, greater demands are constantly placed on excimer laser optical components, for example, the highly reflective mirrors and other optical components that are used in 193 nm wavelength excimer lasers that operate at high repetition rates. The highly reflective mirrors are typically made using at least one high refractive index material and one low refractive index material deposited in multiple layers on a selected substrate.

The deposition of thin optical thin films is known in the art and several different methods or technologies have been used to deposit such films. Among the methods that have been used to deposit tin films, all of which are carried out in vacuum, are (1) Conventional Deposition ("CD"), (2) Ion Assisted Deposition ("IAD"), (3) Ion Beam Sputtering ("or IBS"), and (4) Plasma Ion Assisted Deposition ("PIAD").

In the Conventional Deposition (CD) method, the material(s) to be deposited are heated to the molten state by either a resistance heating method or by electron bombardment, the heating being done in the presence of a substrate upon which a film is to be deposited. When the material to be deposited is molten, evaporation of the material occurs and a film is condensed on the surface of the substrate. At the molten material temperatures used by this method some disassociation of the evaporant takes place. While this dissociation is not a problem when an elemental material is being deposited (for example, elemental aluminum, silver, nickel, etc.), it does present a problem when the material to be deposited is a compound (for example, $SiO_2$, $HfO_2$). In the case of oxide materials, small amounts of oxygen are bled into the chamber during deposition in an attempt to re-store stoichiometry—a so-called reactive deposition. The films that are deposited by the CD method are generally porous and lack sufficient kinetic energy (surface mobility) upon deposition to overcome surface energy (adhesion). Film growth is typically columnar (K. Guenther, *Applied Optics*, Vol. 23 (1984), pp. 3806-3816) with growth in the direction to the source and having a porosity that increases with increasing film thickness. In addition to high film porosity, other problems encountered with CD deposited films include index of refraction inhomogeneity, excessive top surface roughness, and weak absorption. Some improvements, though slight, are possible by adjusting the depositions rate and by increasing the substrate temperature during deposition. However, overall considerations of the final product dictate that CD techniques are not suitable for high quality optical components, for example, telecommunications elements, filters, laser components, and sensors.

Ion Assisted Deposition (IAD) is similar to the CD method described above, with the added feature that the film being deposited is bombarded with energetic ions of an inert gas (for example, argon) during the deposition process, plus some ionized oxygen (which in the case of oxide films is generally necessary to improve film stoichiometry). While ion energies are typically in the range 300 eV to 1000 eV, ion current at the substrate is low, typically a few micro-amps/$cm^2$. (IAD is thus a high voltage, low current density process.) The bombardment serves to transfer momentum to the depositing film and to provide sufficient surface mobility so that surface energies are overcome and dense, smooth films are produced. The index inhomogeneity and transparency of the deposited films are also improved and little or no substrate heating is required for the IAD method.

Ion Beam Sputtering (IBS) is a method in which an energetic ion beam (for example, argon ions in the range 500 eV-1500 eV) is directed to a target material, typically an oxide material. The momentum transferred upon impact is sufficient to sputter-off target material to a substrate where it is deposited as a smooth, dense film. Sputtered material arrives at the substrate with high energy, on the order of several hundred electron volts leading to high packing density and smooth surface, but high absorption of the deposited films is a common by-product of the IAB process. As a result, an IBS process might also include an IAD source to both improve stoichiometry and absorption. While the IBS process is an improvement over CD and IAD, there are nonetheless problems with IBS. Some of the problems with the IBS deposition process include: (1) the deposition process is very slow; (2) it is more of a laboratory technique than a production process; (3) there are few IBS installations in existence, typically remnants from the telecom bubble, and these have only one or two machines operated by a small staff; (4) substrate capacity is quite limited; (5) deposition uniformity over the substrate can become a limitation, which in turn affects product quality and results in a high discard rate; (6) as the target is eroded the uniformity of the film being deposited changes, thus resulting in further quality problems and frequent target change-outs with associated down-time and costs; and (7) the bombardment energy is quite high which in turn leads to disassociation of the deposited materials and hence absorption.

Plasma Ion Assisted Deposition (PIAD) is similar to the IAD process above, except momentum is transferred to the depositing film via a low voltage, high current density plasma. Typical bias voltages are in the range 90-160 v and current densities in the range of milli-amps/$cm^2$. While PIAD instruments are common in the precision optics industry and have been used to deposit films, there are some problems with the PIAD method, particularly in regard to the homogeneity of the deposited film. PIAD deposition has been described in U.S. Pat. No. 7,465,681 in the name of G. Hart, R. Maier and Jue Wang as inventors.

The below 200 nm lasers, also known as deep ultraviolet or "DUV" lasers, have been extensively used in advanced optical lithography to mass-produce patterned silicon wafers for use in semiconductor manufacturing. As the semiconductor process progresses from the 65 nm node to the 45 nm node and beyond, "at wavelength" optical inspection is required for increased resolution. The "at wavelength" optical metrology demands more performance from optical components used in connection with the inspection systems, for example, wide-angle high reflective mirrors for both p-polarization and s-polarization with angles of incidence ranging from 40° to 50° at the wavelength of 193 nm. The wide-angle highly reflective mirrors may also be required in the other areas where an ArF excimer laser is being used, for example as in medical surgery, ultra-precision machining and measurement, large-scale integrated electronic devices, and components for communications.

Generally, at least one high refractive index and one low refractive index material are required for making highly reflective mirrors. A wide-angle highly reflective mirror corresponds to a broad bandwidth in wavelength. The bandwidth is dominated by the refractive index ratio of the coating materials. At a high angle of incidence, the bandwidth of p-polarization narrows and the reflectance decreases; and this makes the preparation of a wide-angle highly reflective mirror a technical challenge when both s- and p-polarizations need to be considered. Highly reflective mirrors can be fabricated by the multilayering of metal oxides, fluorides and fluoride-oxide hybrids. For the oxides the material selection is very limited at 193 nm. A combination of $Al_2O_3$ and $SiO_2$ is frequently used as the high and low refractive index coating materials, respectively. For the $Al_2O_3$ and $SiO_2$ system the refractive index ratio (high index÷low index) is relative small (~1.16) at 193 nm when compared to a ratio of 1.56 for an $HfO_2$—$SiO_2$ combination at 248 nm and 2.07 for $TiO_2$—$SiO_2$ combination at 550 nm. For fluoride materials, $GdF_3$ and $LaF_3$ are considered as high refractive index materials, whereas $MgF_2$ and $AlF_3$ are the low refractive index materials. [See D. Ristau et al, "Ultraviolet optical and microstructural properties of $MgF_2$ and $LaF_3$ coating deposited by ion-beam sputtering and boat and electron-beam evaporation", *Applied Optics* 41, 3196-3204 (2002); C. C. Lee et al, "Characterization of $AlF_3$ thin films at 193 nm by thermal evaporation", *Applied Optics* 44, 7333-7338 (2005); and Jue Wang et al., "Nanoporous structure of a GdF3 thin film evaluated by variable angle spectroscopic ellipsometry," *Applied Optics* 46(16), 3221-3226 (2007).] A combination of $GdF_3$—$AlF_3$ gives a refractive index ratio of 1.23 at 193 nm, which is higher than that of $Al_2O_3$—$SiO_2$ combination that has a ratio of approximately 1.16. Thermal resistance evaporation of fluorides has been proved to be a good way to evaporate fluoride without introducing fluorine depletion. However, surface/interface roughness and inhomogeneity of fluoride multilayer increase resulting in high scatter loss as the number of fluoride layers and their thickness increase. As a result, the mean refractive index ratio decreases as number of fluoride layers increases and this restricts the achievable reflectance and bandwidth.

U.S. application Ser. No. 12/156,429, filed May 29, 2008 (Publication No. US 20080204862A1, assigned to Corning Incorporated) describes the use of an oxide-fluoride hybrid approach to eliminate scatter loss and increase environmental stability. By using the approach described in US 20080204862A1, a reflectance of approximately 98.5% at 193 nm at normal angle of incidence has been achieved. However, the bandwidth of the fluoride-oxide hybrid high reflective mirror is limited due to the refractive index ratio of $Al_2O_3$—$SiO_2$ which is approximately 1.16 at 193 nm. The bandwidth of the highly reflective mirror can be improved by changing coating materials to increase the ratio. One technical approach is to use a sol-gel process in which nano-porous structures are introduced to further reduce film refractive indices. The nano-porous films can be deposited by a dip coating or a spin coating. The refractive index of nano-porous silica film can be as low as 1.20. [See Jue Wang et al., "Scratch-resistant improvement of sol-gel derived nano-porous silica films," *J. Sol-Gel Sci. and Technol.* 18, 219-224 (2000).] The advantages of the sol-gel derived ultralow refractive index has been demonstrated on wide-angle anti-reflection coating at 193 nm, in which 1 layer of the ultralow refractive index material is spin-coated on top of physically evaporated films. [See T. Murata et al., "Preparation of high-performance optical coatings with fluoride nanoparticles films made from autoclaved sols," *Applied Optics* 45 1465-1468 (2006).] However, this process is not suitable for highly reflective mirrors. Thus, while considerable effort has been put forth to find a suitable high/low refractive index coating system to improve the performance of highly reflective optical elements, no satisfactory coating system currently exists in the art.

SUMMARY

The invention is directed to highly reflective optical elements having an amorphous $MgAl_2O_4$—$SiO_2$ coating with fluoride enhancements inserted and sealed by dense smooth $SiO_2$ layers, and to a method for preparing such elements using energetic deposition techniques and the spinel crystalline form of $MgAl_2O_4$ as the source of the amorphous $MgAl_2O_4$ coating, The coating and the method described herein can be used to make highly reflective mirrors, and can also be applied to beamsplitters, prisms, lenses, output couplers and similar elements used in <200 nm laser systems.

In one embodiment the invention is directed to a method for making optical element having a coating comprising one or a plurality of $MgAl_2O_4$ layers, and one or a plurality of silicon dioxide layers, the method comprising the steps of providing a vacuum chamber and within said chamber; providing an optical element made from a selected substrate material, said element being located on a rotatable plate; providing at least one selected coating material source, or a mixture of coating materials source, and vaporizing said material(s) using an e-beam to provide a coating material vapor flux, said flux passing from said material source by a mask having a selected shape to said optical element (see FIG. 3); providing plasma ions from a plasma source; rotating said element at a selected rotation frequency f; and depositing said coating material on the surface of said optical element as a coating film and bombarding said film on said element with said plasma ions during said material deposition process to thereby form an adhesive, hermetic film on said element. In a preferred embodiment the selected coating material source is the single crystal form of $MgAl_2O_4$ which may be present as a single crystal or a powder made from the single crystal.

Figure 3:
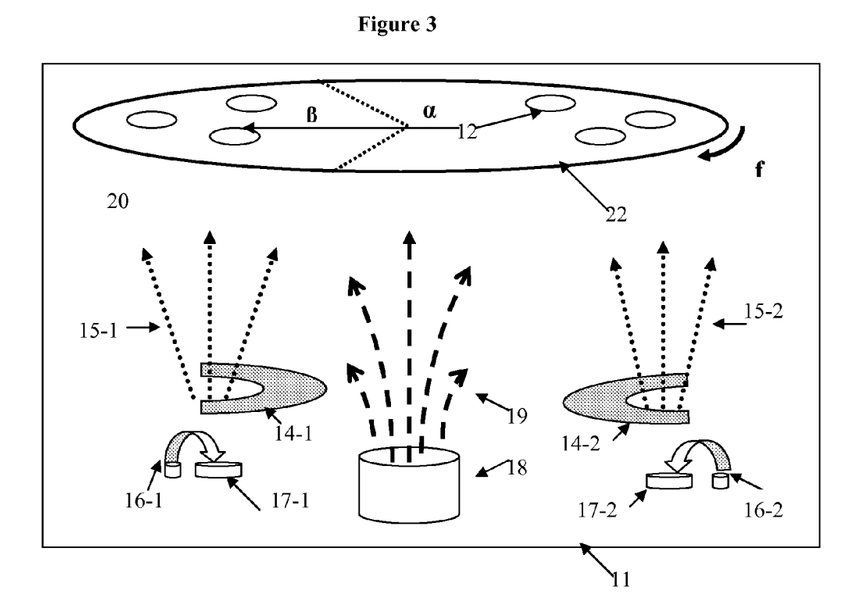
FIG. 3 is a schematic diagram of a modified PIAD method for depositing oxide films on optical elements with in-situ plasma smoothing.

In another embodiment the invention is directed to a method for making optical elements having a coating comprising one or a plurality of $MgAl_2O_4$ layers, one or a plurality of alkaline earth metal fluoride layers, and one or a plurality of silicon dioxide layers, the method comprising the steps of providing a vacuum chamber and within said chamber; providing an optical element made from a selected substrate material, said element being located on a rotatable plate; providing at least one selected coating material source, or a mixture of coating materials source, and vaporizing said material(s) using an e-beam to provide a coating material vapor flux, said flux passing from said material source by a mask having a selected shape to said optical element; providing plasma ions from a plasma source; rotating said element at a selected rotation frequency f; and depositing said coating material on the surface of said optical element as a coating film and bombarding said film on said element with said plasma ions during said material deposition process to thereby form dense, smooth and amorphous multilayer optical coatings on said element. For fluoride materials, the vaporization can also be generated by two thermal resistance boats that contain the fluoride raw materials with a set of partial or reversed masks in the same vacuum chamber used for the oxide coatings. A plurality of alkaline earth metal fluoride layers can be deposited by turning on the two thermal resistance evaporation sources or the two electron beam evaporation sources alternatively with or without plasma ion assistant. After building up of the fluoride stack, a layer of SiO2 is deposited on top of the fluoride stack with the same plasma smoothing process as described for the deposition of the oxide stack using masking technique. The mask is selected from the group consisting of a partial mask (as illustrated in FIG. 3 of commonly owned U.S. 20080204862A1) and a reverse mask (as illustrated in commonly owned U.S. Pat. No. 7,465,681). In a preferred embodiment the mask is a partial mask as illustrated herein by FIG. 3 of the accompanying drawings. Also in preferred embodiment the selected coating material source is the single crystal form of $MgAl_2O_4$ which may be present as a single crystal or a powder made from the single crystal.

In one embodiment the invention is directed to an optical element comprising a selected substrate and an amorphous coating of formula $(H_oL_o)^iH_o$ on said substrate, wherein $(H_oL_o)^i$ is a stack of a plurality i of coating periods consisting of a $H_o$ layer and a $L_o$ layer on said substrate, i is in the range of 14-20;

$H_o$ is amorphous $MgAl_2O_4$ and $L_o$ is amorphous $SiO_2$, to thereby form an amorphous $MgAl_2O_4$—$SiO_2$ coating on said substrate, the $H_o$ layer of the first period being in contact with the substrate.

In another embodiment the invention is directed to an optical element consisting of:

a selected substrate having a first coating having a formula $(H_oL_o)^iH_o$, a second coating of formula $(L_fH_f)^j2M_o$ on top of said first coating, and a third coating of formula $(L_fH_f)^k2M_o$ on top of said second coating;

wherein $(H_oL_o)^i$ is a stack consisting of a plurality i of periods $H_oL_o$ on said substrate, i is in the range of 14-20, $H_o$ is amorphous $MgAl_2O_4$, $L_o$ is amorphous $SiO_2$ and the $H_o$ layer of the first period is in contact with the substrate;

and $(L_fH_f)^j$ is a stack formed on top of $(H_oL_o)^iH_o$ and is a plurality j of periods $L_fH_f$ formed by alternating layers where $L_f$ is the first layer and $H_f$ is the second layer, j is an integer in the range of 2 to 6, and $2M_o$ is a coating on top of said $(L_fH_f)^j$ stack; and $(L_fH_f)^k$ is a stack formed on top of $(L_fH_f)^j2M_o$ and is a plurality k of periods $L_fH_f$ formed by alternating layers where $L_f$ is the first layer and $H_f$ is the second layer, k is an integer in the range of 2 to 6 on top of said $(L_fH_f)^k$ coating, and a $2M_o$ is a coating on top of said $(L_fH_f)^k$ stack; and $L_f$ is a low refractive index metal fluoride and $H_f$ is a high refractive index metal fluoride, and $2M_o$ is an oxide material selected from the group consisting of silica, fused silica and F-doped fused silica.

An optical element comprising a selected a selected substrate having a first coating of formula $(H_oL_o)^iH_o$, a second coating of formula $(L_fH_f)^j2M_o$ on top of said first coating, and a third coating of formula $H_f(L_fH_f)^k2M_o$ on top of said second coating;

wherein $(H_oL_o)^i$ is a stack consisting of a plurality i of coating periods $H_oL_o$ on said substrate, i is in the range of 14-20, $H_o$ is amorphous $MgAl_2O_4$, $L_o$ is amorphous $SiO_2$ and the $H_o$ layer of the first period is in contact with the substrate; and $(L_fH_f)^j$ is a stack formed on top of $(H_oL_o)^iH_o$ and is a plurality j of periods $L_fH_f$ formed by alternating layers where $L_f$ is the first layer and $H_f$ is the second layer, j is an integer in the range of 2 to 6, and $2M_o$ is a coating on top of said $(L_fH_f)^j$ stack;

$H_f$ is a first high refractive index metal fluoride layer formed on top of the second coating, and $(L_fH_f)^k$ is a stack, formed on top of said first high refractive index layer $H_f$, of a plurality k of periods $L_fH_f$ formed by alternating layers where $L_f$ is the first layer and $H_f$ is the second layer, k is an integer in the range of 2 to 6, and a $2M_o$ is a coating on top of said $(L_fH_f)^k$ stack; and wherein $L_f$ is a low refractive index metal fluoride and $H_f$ is a high refractive index metal fluoride, and $2M_o$ is an oxide material selected from the group consisting of silica, fused silica and F-doped fused silica.

The invention is further directed to a method of making a highly reflective optical element, the method having the steps of:

providing a vacuum chamber and within said vacuum chamber;

providing a substrate on which one or a plurality of coating are to be deposited; providing at least one selected coating material source, or a mixture of coating materials source, and vaporizing said material(s) to provide a coating material vapor flux, said flux passing from said material source through a selected mask to said substrate;

providing plasma ions from a plasma source;

rotating said substrate at a selected rotation frequency f;

depositing said coating material(s) on said substrate as one or a plurality of coating layers and bombarding said substrate and said film with said plasma ions before and during said material deposition process for thereby form a substrate have one or a plurality of coating thereon;

wherein coating said substrate means coating said substrate with a first coating of formula $(H_oL_o)^iH_o$, a second coating of formula $(L_fH_f)^j2M_o$ on top of said first coating, and a third coating of formula $(L_fH_f)^k2M_o$ on top of said second coating to provide an optical element having a highly reflective coating thereon; and wherein:

$(H_fL_f)^i$ is a stack consisting of a plurality i of coating periods $H_fL_f$ on said substrate, i is in the range of 10-25, Ho is amorphous $MgAl_3O_4$, $L_f$ is amorphous $SiO_2$ and the $H_o$ layer of the first period is in contact with the substrate;

$(L_fH_f)^j$ is a stack formed on top of $(H_oL_o)^iH_o$ and is a plurality j of periods $L_fH_f$ formed by alternating layers where Lf is the first layer and $H_f$ is the second layer, j is an integer in the range of 2 to 6, and 2Mo is a coating on top of said $(L_fH_f)^j$ stack;

$(L_fH_f)^k$ is a stack, formed on top of said first high refractive index layer $H_f$, of a plurality k of periods $L_fH_f$ formed by alternating layers where Lf is the first layer and $H_f$ is the second layer, k is an integer in the range of 2 to 6, and a $2M_o$ is a coating on top of said $(L_fH_f)^k$ stack; and $L_f$ is a low refractive index metal fluoride and $H_f$ is a high refractive index metal fluoride, and $2M_o$ is an oxide material selected from the group consisting of silica, fused silica and F doped fused silica. In forming the optical elements in one embodiment the fluoride stacks are deposited with a set of partial or reversed masks from electron beam or thermal resistance heated evaporation sources. On another embodiment the fluoride stacks are deposited with a set of partial or reversed masks using electron beam or thermal resistance heated evaporation sources with a fluorine containing inert gas.

The invention is also directed to a method of making a highly reflective optical element, the method having the steps of:

providing a vacuum chamber and within said vacuum chamber;

providing a substrate on which one or a plurality of coating are to be deposited;

providing at least one selected coating material source, or a mixture of coating materials source, and vaporizing said material(s) using an e-beam to provide a coating material vapor flux, said flux passing from said material source through a selected mask to said substrate;

providing plasma ions from a plasma source;

rotating said substrate at a selected rotation frequency f;

depositing said coating material(s) on said substrate as one or a plurality of coating layers and bombarding said substrate and said film with said plasma ions before and during said material deposition process for thereby form a substrate have one or a plurality of coating thereon;

wherein coating said substrate means coating said substrate with a first coating of formula $(H_oL_o)^iH_o$, a second coating of formula $(L_fH_f)^j2M_o$ on top of said first coating, and a third coating of formula $H_f(L_fH_f)^k2M_o$ on top of said second coating to provide an optical element having a highly reflective coating thereon;

wherein: $(H_oL_o)i$ is a stack consisting of a plurality i of coating periods $H_oL_o$ on said substrate, i is in the range of 14-20, $H_o$ is amorphous $MgAl_2O_4$, Lo is amorphous $SiO_2$ and the $H_o$ layer of the first period is in contact with the substrate; and $(L_fH_f)^j$ is a stack formed on top of $(H_oL_o)^iH_o$ and is a plurality j of periods $L_fH_f$ formed by alternating layers where $L_f$ is the first layer and $H_f$ is the second layer, j is an integer in the range of 2 to 6, and $2M_o$ is a coating on top of said $(L_fH_f)j$ stack;

$H_f$ is a first high refractive index metal fluoride layer formed on top of the second coating, and $(L_fH_f)^k$ is a stack, formed on top of said first high refractive index layer $H_f$, of a plurality k of periods $L_fH_f$ formed by alternating layers where $L_f$ is the first layer and $H_o$ is the second layer, k is an integer in the range of 2 to 6, and a $2M_o$ is a coating on top of said $(L_fH_f)k$ stack; and wherein Lf is a low refractive index metal fluoride and $H_f$ is a high refractive index metal fluoride, and $2Mo$ is an oxide material selected from the group consisting of silica, fused silica and F doped fused silica. In forming the optical elements in one embodiment the fluoride stacks are deposited with a set of partial or reversed masks from electron beam or thermal resistance heated evaporation sources. On another embodiment the fluoride stacks are deposited with a set of partial or reversed masks using electron beam or thermal resistance heated evaporation sources with a fluorine containing inert gas.

In some embodiments of the invention $L_f$ consisting of $AlF_3$ and $MgF_2$. In some embodiments $H_f$ is selected from the group consisting of $LaF_3$ and $GdF_3$.

DETAILED DESCRIPTION

As used herein, the term "period" refers to a $H_oL_o$ or $L_fH_f$ layer pair representing that repeats to form a periodical multilayer structure, where the subscript "o" and "f" stands for oxides and fluorides, respectively. The term "stack" refers to a plurality of such layers. Thus, in FIG. 11, the notations $(H_oL_o)^iH_o$ means that on the substrate a stack is formed consisting of a plurality "i" of periods formed by the layer pair $H_oL_o$ (one period equals one layer pair) that are laid down on the substrate in the order $H_o$ followed by $L_o$, and that after the last period of the stack is formed, that is, the $i^{th}$ period of the stack which ends with a $L_o$ layer, a final $H_o$ layer is placed on top of the stack. Herein, the $H_o$ material is $MgAl_2O_4$ and the $L_o$ material is selected from the group consisting of $SiO_2$, F-doped $SiO_2$ and fused silica. The notation $(L_fH_f)^j2M_o$ and $(L_fH_f)^k2M_o$ means after the $(H_oL_o)^iH_o$ stack is formed a $(L_fH_f)^j2M_o$ stack is formed on top of the $(H_oL_o)^iH_o$ stack followed by the formation of a $(L_fH_f)^k2M_o$ stack on top of the $(L_fH_f)^j2M_o$ stack. The $(L_fH_f)^j2M_o$ and $(L_fH_f)^k2M_o$ stacks have a plurality "j" and "k", respectively, of periods of layer pairs $L_fH_f$ that are laid down on the substrate in the order $L_f$ followed by $H_f$, and each stack ends with a stack of $2M_o$ layers. That is, when the $j^{th}$ or $k^{th}$ period is formed, which ends with a $H_f$ layer, a stack of $2M_o$ layers is placed on top of (or caps) the final $H_f$ layer of the stack. $H_o$, $L_o$, $L_f$, $H_f$, and $2M_o$ are as described herein. The values for "i," "j," and "k" are in the range of 14-20, 2-6 and 2-6, respectively. Thus, if i=14, there are 14 periods of $H_oL_o$ pairs followed by a final (or capping) $H_o$ layer. Values of j and k have the same meaning for the $L_fH_f$ periods. Thus, if j=6, there are 6 periods of $L_f$ and $H_f$ pairs followed by a final (or capping) $2M_o$ layer or stack of layers. Also as used herein the term "fused silica" means a fused silica starting material for laying down a $L_o$ layer or a capping layer, said fused silica being HPFS® high purity fused silica (Corning Incorporated) or similar material available from other sources.

With regard to the thicknesses of the individual layers, periods and stacks, when coating with $MgAl_2O_4$—$SiO_2$, the thickness of $H_o$ and $L_o$ together form a stack of periods whose thickness is in the range of 600 to 1200 nm, preferably in the range of 860 nm to 1100 nm. Regarding the fluoride periods, in each period the $H_f$ and $L_f$ layers have a thickness in the range of 20 nm to 40 nm and 30 nm to 50 nm; the thickness of a stack of $H_f$ and $L_f$ periods is in the range of 140 nm to 420 nm. The thickness of the $2M_o$ coating material is in the range of 5 nm to 75 nm. The $2M_o$ materials are selected from the group consisting of $SiO_2$, F-doped $SiO_2$, fused silica, $Al_2O_3$ doped $SiO_2$, and F-doped $Al_2O_3$.

In practicing the invention, individual layer or period of materials can be smoothed to increase their density and reduce surface roughness (and this minimize scattering) by either in-situ plasma smoothing or "turning off" the material being deposited and applying only the smoothing plasma to the surface. When oxides are being coated the smoothing plasma is derived from an oxygen containing inert gas with a set of partial or reversed masks. When fluorides are being coated the smoothing plasma is derived from a fluorine containing inert gas with a set of partial or reversed masks, or a mixture of oxygen and inert gas when a buffering SiO$_2$ layer is on top of the fluoride stack.

Highly reflective mirrors for laser lithographic systems are typically made using a selected substrate that is coated with alternating layers of a high refractive index material ("H") and a low refractive index material ("L"). The selected substrates can be alkaline earth metal fluoride single crystal materials (single crystals of CaF$_2$, BaF$_2$, SrF$_2$, BaF$_2$), glass materials (for example without limitation, SiO$_2$, HPSF® (Corning Incorporated), BK7™ and SF10™ (Schott Glass)), metallic materials (for example without limitation, aluminum, titanium), glass materials having a metallic coating thereon, and other materials (for example without limitation, Si and Si$_3$N$_4$).

The bandwidth of a highly reflective mirror is mainly determined by the refractive index ratio of the H and L coating materials, if the materials are absorption free in the spectral region of interest. However, at 193 nm, oxide coating materials, especially high refractive index materials such as Al$_2$O$_3$, are not absorption free. In addition, when SiO$_2$ is used as the low index coating material, the refractive ratio of Al$_2$O$_3$—SiO$_2$ is only 1.16. These two factors, absorption and low refractive ratio, decrease the high reflectance and the bandwidth of Al$_2$O$_3$—SiO$_2$ coated mirrors. If metal fluorides are used as the coating materials, the resulting coatings are almost absorption free, and the refractive index ratio for a (GdF$_3$—AlF$_3$) coating can be as high as 1.23 based on fluoride single layer results. However, as the number of metal fluoride layers increases the mean refractive ratio decreases, mainly due to the increase of fluoride film porosity. The reduction of the metal film packing density also leads to high scatter loss. As a result, the reflectance and the bandwidth of fluoride based mirrors are also restricted. In order to make broadband, highly reflective mirrors for use at 193 nm it is necessary to find a solution to reduce film absorption and scatter loss, and also to increase refractive index ratio.

The present invention as described herein results from the combination of five technical solutions that were successfully incorporated into the invention in order to achieve the goal of increasing the bandwidth of highly reflective mirrors at 193 nm. The successful incorporation of these solutions resulted in an oxide-smoothed and fluoride-enhanced oxide mirror with a wide-angle high reflectance at 193 nm. These incorporated technical solutions are:

1. The refractive index ratio was increased by using an amorphous film of MgAl$_2$O$_4$ (refractive index, n=1.96) instead of Al$_2$O$_3$ (refractive index, n=1.84) in the oxide based multilayer. The amorphous MgAl$_2$O$_4$ film was generated by using single crystal spinel MgAl$_2$O$_4$ as the coating material source. The single crystal spinel MgAl$_2$O$_4$ may be present as a single crystal or a powder made from the single crystal.
2. Dense amorphous MgAl$_2$O$_4$ films were deposited on the substrate using a modified PIAD deposition method that incorporated in-situ plasma smoothing.
3. The absorption of the outermost MgAl$_2$O$_4$ layers was reduced by using fluoride multilayer enhancement by deposition, one or a plurality of periods consisting of a low refractive index fluoride material layer and a high refractive index fluoride material layer.
4. Scatter loss of the deposited fluoride-enhance layers was eliminated by using a set of partial or reversed masks with inserted SiO$_2$ layers between periods to buffer and control fluoride film structure. The SiO$_2$ insertion can be between stacks consisting of a plurality fluoride periods. For example, if there are a total of 15 fluoride periods, a SiO$_2$ layer can be inserted after every 5$^{th}$ period.
5. The fluoride stack was isolated from the environment by a SiO$_2$ sealing layer (as the outermost layer) to form an oxide-smoothed and fluoride-enhanced oxide mirror. That is, the last coating layer of the oxide-smoothed and fluoride-enhanced oxide mirror is a SiO$_2$ layer.

As a result of the foregoing steps one produces a highly reflective mirror comprising a selected substrate, a MgAl$_2$O$_4$—SiO$_2$ multilayer coating on top of the substrate, one or a plurality of stacks of metal fluoride coating (without or preferably SiO$_2$ layers inserted between metal fluoride coating periods), and a final, outermost SiO$_2$ layer, or period of several layers, to seal the fluoride coating material from the environment.

Increased Bandwidth of Oxide Based Mirror by Using MgAl$_2$O$_4$

Figure 1:
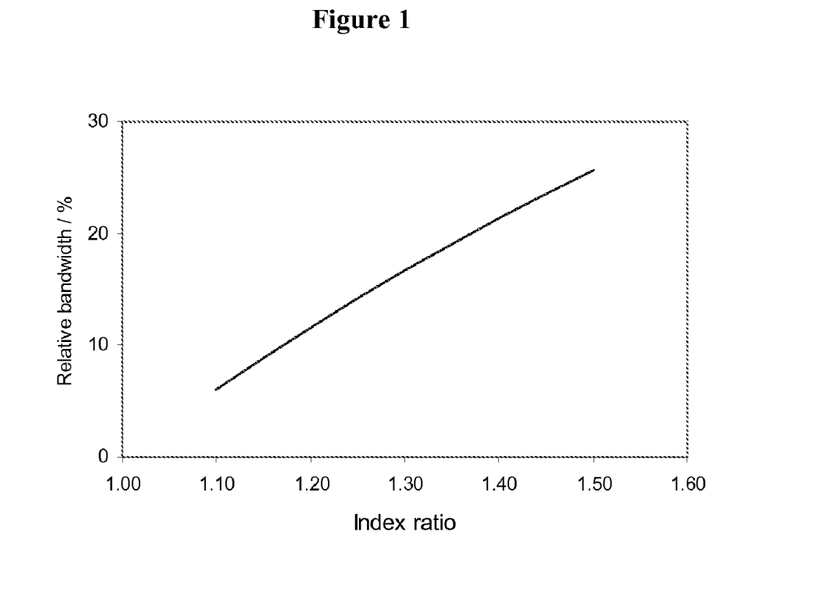
FIG. 1 is a graph illustrating relative bandwidth of a mirror as a function of the refractive index ratio.
Figure 2:
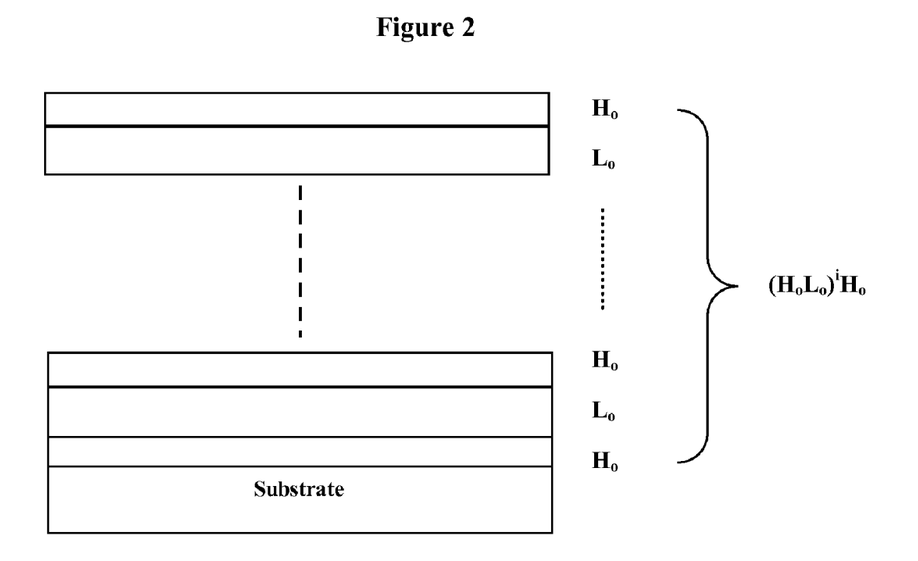
FIG. 2 is a schematic diagram of a standard $MgAl_2O_4$—$SiO_2$ mirror according to the invention.

Standard high reflective mirrors comprise multilayer of high refractive index material H, and low refractive index material L, i.e., an H-L based mirror. The bandwidth of the mirror is dominated by the ratio of the high and the low refractive indices used to build the multilayer structure. In order to illustrate how the coating works, a standard quarter-wave mirror at normal angle of incidence is used as an example. The quarter-wave mirror compromises stacks of high and low refractive index layers in a formula of Equation (1)

$$(HL)^i H \tag{1}$$

where H and L correspond to a quarter-wave of the high and low refractive index layers and i is the number of the H-L pair. The relative bandwidth $\Delta\lambda/\lambda_0$ can be described by $$\frac{\Delta\lambda}{\lambda_0} = \frac{4}{\pi}\sin^{-1}\left(\frac{\gamma-1}{\gamma+1}\right) \tag{2}$$

where $\gamma$ is the ratio of the high refractive index n$_H$ to the low refractive index n$_L$, corresponding to layer H and L, respectively, and $\Delta\lambda$ is the bandwidth of the high reflective mirror center at a wavelength of $\lambda_0$. FIG. 1 shows the relative bandwidth of the mirror as a function of the refractive index ratio. As FIG. 1 shows, the relative bandwidth is proportional to the refractive index ratio. In other words, a broadband mirror requires a large refractive index ratio. Using MgAl$_2$O$_4$—SiO$_2$ as a HL coating pair, the bandwidth at 193 nm of the MgAl$_2$O$_4$—SiO$_2$ based mirror is 44% broader that that of the Al$_2$O$_3$—SiO$_2$ based mirror due to the increase of the high refractive index from 1.84 for the Al$_2$O$_3$ to a higher refractive index of 1.96 for MgAl$_2$O$_4$. To achieve the broad bandwidth it is necessary that the MgAl$_2$O$_4$ multilayer coating be deposited with low scatter and low absorption for the 193 nm highly reflective mirror application.

Deposit Dense Amorphous MgAl$_2$O$_4$ Films

The MgAl2O4 films used herein were deposited using a modified PIAD technique. The deposition flux distribution and its interaction with plasma ion can modify film optical and mechanic properties as has been described by Wang et al, "Wavefront control of SiO$_2$-based ultraviolet narrow-bandpass filters prepared by plasma-ion assisted deposition," *Applied Optics* 46(2), pp. 175-179 (2007). In addition, the crystal phase of PIAD films may be altered by varying the amount of plasma ion momentum transfer during film deposition as discussed by Wang et al, "Crystal phase transition of HfO$_2$ films evaporated by plasma ion-assisted deposition,"

*Applied Optics* 47(13), C189-192(2008). MgAl$_2$O$_4$ has spinel crystalline structure. For use as a coating for highly reflective optical elements it is necessary that the material be deposited as a dense and amorphous MgAl$_2$O$_4$ film, which enables one to control the MgAl$_2$O$_4$—SiO$_2$ based multilayer structure with ignorable scatter loss at 193 nm.

In order to achieve the formation of dense, amorphous films, plasma smoothing ("PS") has been integrated into the PIAD process by means of masking technology, leading to in-situ plasma smoothing as has been described in FIG. 3 which schematically illustrates the in-situ plasma smoothing process. FIG. 3 illustrates a deposition set-up 20 having a vacuum chamber 11 in which is located a rotatable element holder 22 on which optical elements 12 to be coated are located, an e-beam 16-1 that impinges on a target 17-1 to produce a vapor flux 15-1 that passes by the mask 14-1 for deposition a layer of one coating material, for example, MgAl$_2$O$_4$ as high refractive index, on elements 12. After completing the 1$^{st}$ layer, another e-beam 16-2 that impinges on a target 17-2 to produce a vapor flux 15-2 that passes by the mask 14-2 for deposition a layer of the second coating material, for example, SiO$_2$ as low refractive index, on top of the 1$^{st}$ layer on elements 12. By repeating the high refractive and low refractive index layers, an oxide stack with periodic layer structure of the two coating materials can be established on the element surfaces. In addition there is a plasma source 18 that generates plasma 19. The rotatable element holder 22 can have openings through the holder element for placements of optical elements 12 so that only one side of the optical element is to be coated. During film deposition, the plasma ion interacts with the deposited oxide molecules in zone β, whereas in zone α the plasma bombards the existing surface, leading to in-situ plasma smoothing. This coating process with in-situ plasma smoothing can be described by plasma momentum transfer per deposited atom P, which is the sum of momentum transfer in zone α ($P_\alpha$) and zone β ($P_\beta$) (that is, the sum of plasma momentum transfer of PS and PIAD), in units of (a.u. eV)$^{0.5}$ during coating is shown in Equation (3):

$$P = P_\alpha + P_\beta = \frac{1}{2\pi}\left(\frac{\alpha}{R}\kappa + \frac{\beta}{n_s f}\right) J_i \sqrt{2m_i e V_b} \quad (3)$$

where $V_b$ is the plasma bias voltage; $J_i$ and $m_i$ are the plasma ion flux in ion/(cm$^2$ sec) and mass in a.u., respectively; R is the deposition rate in nm/sec; e is the electron charge; $n_s$ is the surface atom density of the deposited film in atom/cm$^2$, and κ is a unit conversion factor; and α and β are the radian of the mask shadowed and un-shadowed area of the vapor flux relative to the center of the rotatable plate which is rotated with a frequency f, frequency f being in the range of 4 to 36 rpm.

Figure 5:
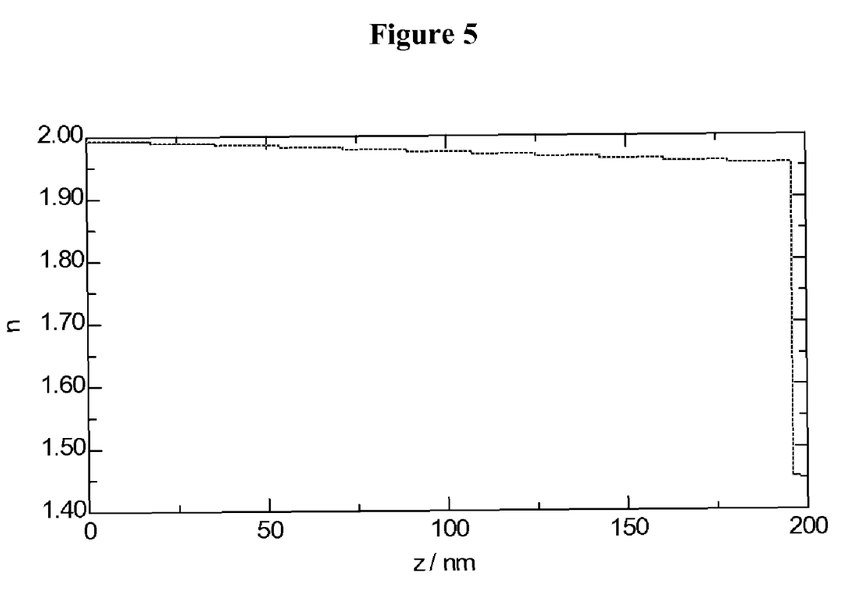
FIG. 5 is a graph illustrating the refractive index depth profile of a 198 nm $MgAl_2O_4$ film deposited by a standard PIAD.

In preferred embodiments of the invention the films are deposited on the substrate or other film layers using a "partial mask" as illustrated in FIG. 3 or the "reverse mask" as described in commonly owned U.S. Pat. No. 7,456,681 instead of a regular mask as commonly used in the industry. Adjusting the ratio of α and β, APS (Advanced Plasma Source) parameters, deposition rate, and substrate rotation frequency allows one to separately control the amount of momentum transfer for plasma assisted deposition and plasma smoothing. This results in improved smoothness at the film surface as well as homogeneity in the film volume, which is crucial for low loss DUV applications. The shape of the mask used in practicing the invention is principally determined by the ratio of α/β, which should be between 1 and 4 ($1 \leq \alpha/\beta \leq 4$). A "regular" mask would have no opening through the mask and it is directly above the target 17; a reverse mask described in U.S. Pat. No. 7,456,681 would have an opening through the mask. When using a "partial mask" as illustrated in FIG. 5, the ratio of α/β should be in the range of 1-4.

Figure 4:
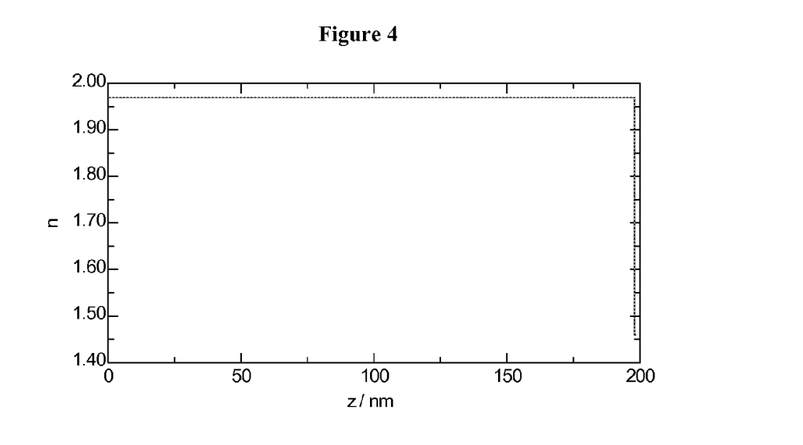
FIG. 4 is a graph illustrating the refractive index depth profile of a 196 nm $MgAl_2O_4$ film deposited by the modified PIAD with in-situ plasma smoothing.
Figure 6:
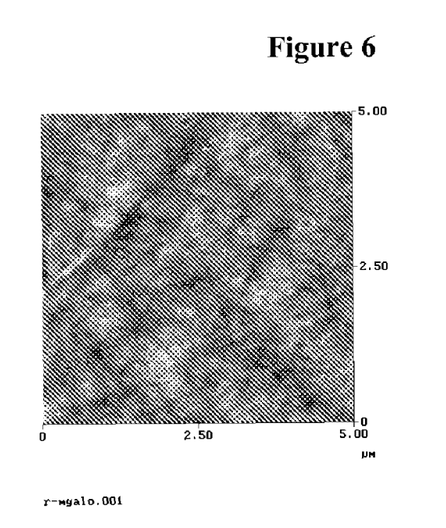
FIG. 6 is an AFM image of the 196 nm $MgAl_2O_4$ film deposited by the modified PIAD process with in-situ plasma smoothing (rms=0.27 nm).
Figure 7:
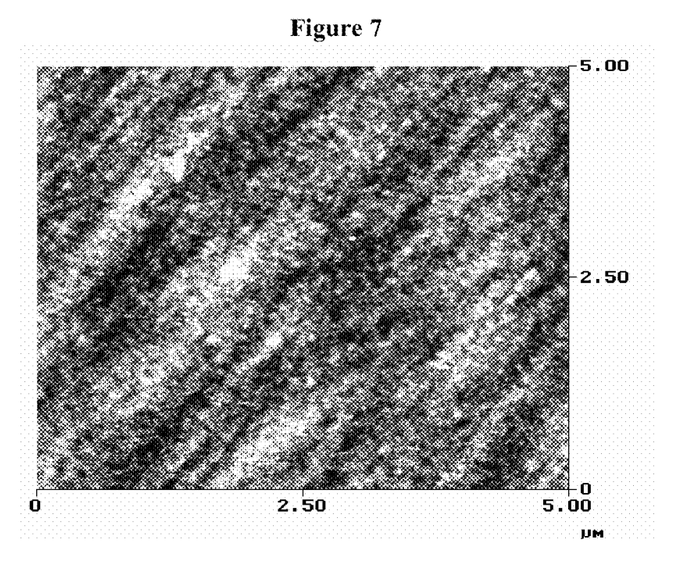
FIG. 7 is an AFM image of the 198 nm $MgAl_2O_4$ film deposited by a standard PIAD (rms=0.71 nm).

FIG. 4 shows the refractive index depth profile (at 193 nm wavelength) of a 196 nm MgAl$_2$O$_4$ film deposited by the modified PIAD with in-situ plasma smoothing. The unique refractive index n in the film depth profile z/nm represents a dense and homogeneous film microstructure. In FIG. 4, z represents a cross section of the film where the substrate-film interface is a z=0 nm and the film-air interface z=193 nm. The modeled surface roughness for the 196 nm thick MgAl$_2$O$_4$ film is 0.3 nm in rms. For comparison, FIG. 5 shows the refractive index depth profile of a 198 nm MgAl$_2$O$_4$ deposited by a standard PIAD process without the use of the in-situ plasma smoothing. Although an average refractive index of 1.96 is obtained at 193 nm, the index depth profile indicates a small amount of inhomogeneity as the thickness increases. That is, the refractive index slightly decreases as film thickness increases. From the comparison of FIGS. 4 and 5, one can determine that the surface roughness of the standard PIAD MgAl$_2$O$_4$ film of FIG. 5 is 3-fold greater than that of the film illustrated in FIG. 4 (modified PIAD with in-situ plasma smoothing). The surface roughness difference is further confirmed by AFM measurement. The measured surface roughness in RMS (root-mean-square) over 5μ×5μ is 0.71 nm for the standard film (FIG. 7, standard PIAD deposition), and 0.27 nm for the modified film (FIG. 6, modified PIAD with in-situ plasma smoothing), a surface reduction of approximately 62%.

Figure 8:
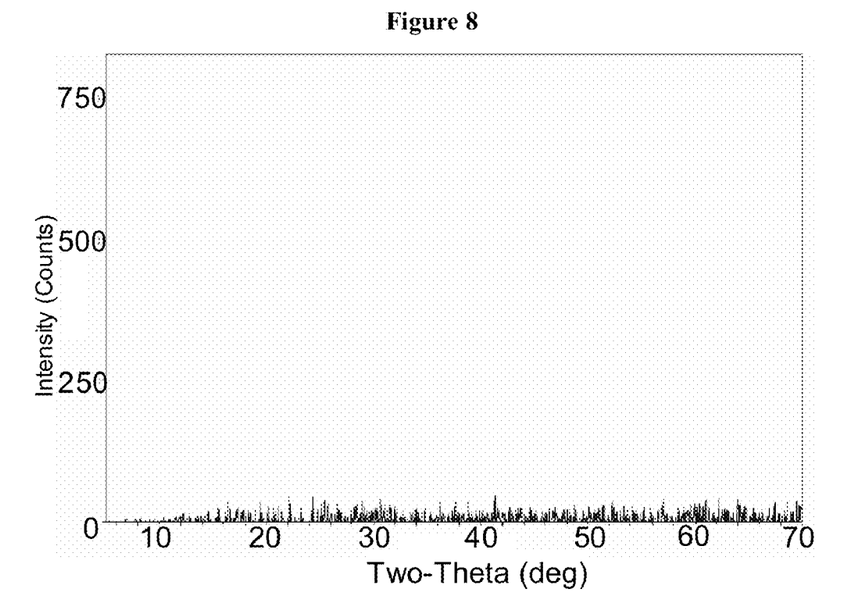
FIG. 8 is an XRD of a 196 nm $MgAl_2O_4$ film deposited by a modified PIAD with in-situ plasma smoothing.
Figure 9:
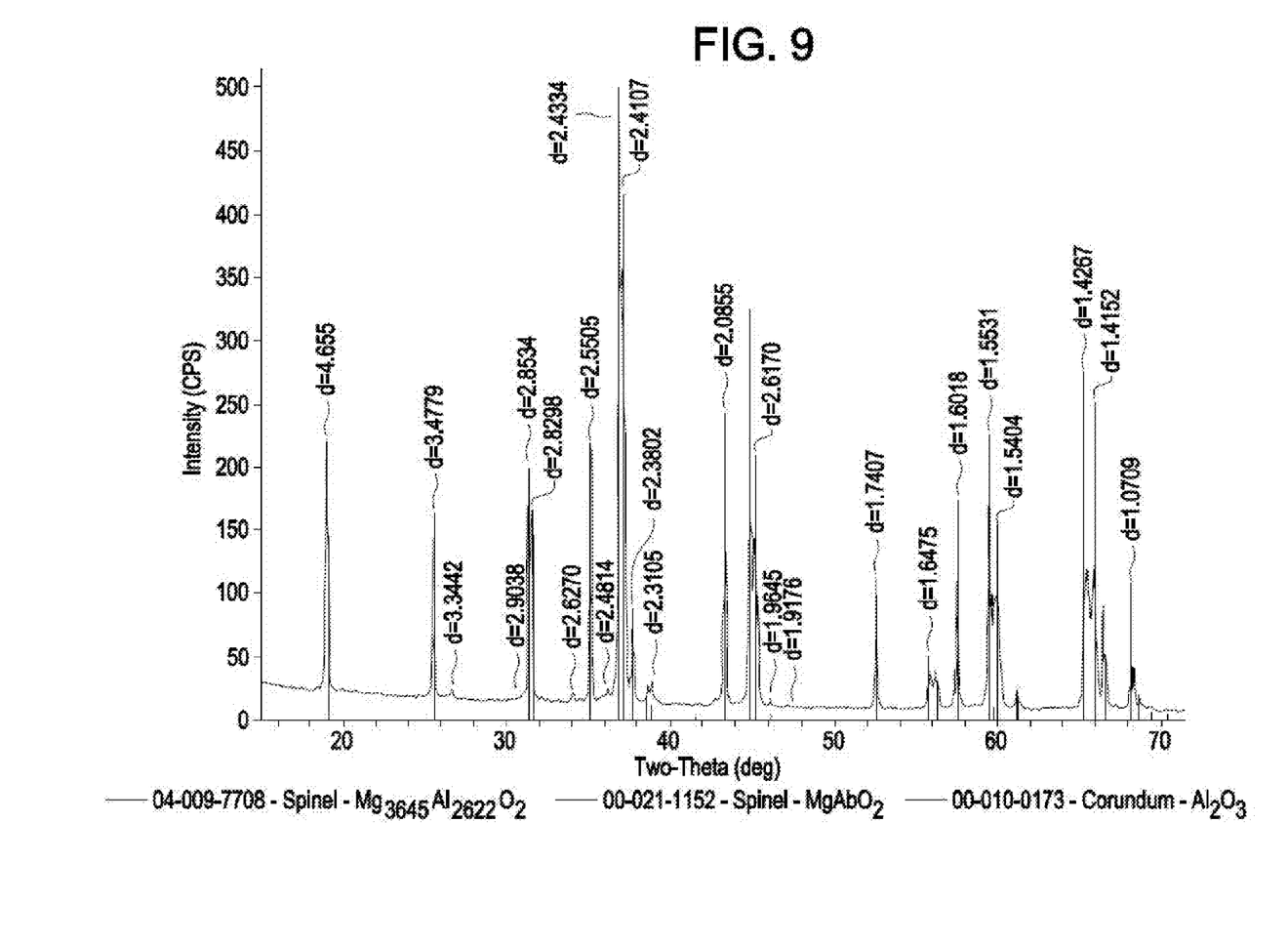
FIG. 9 is an XRD of $MgAl_2O_4$ spinel as starting material for the amorphous $MgAl_2O_4$ film deposition.

Appropriate adjusting the deposition parameters described in Eq. (3) enables one to deposit dense, smooth and amorphous films while keeping chemical composition unchanged. The desired amorphous MgAl$_2$O$_4$ film was deposited on SiO$_2$ substrates as schematically illustrated in FIG. 3. The rotating substrate holder 12 located in the top of the chamber 11 was negatively biased relative to the plasma. The ions from the plasma sheet were accelerated to the substrates, bombarding the growing film while the electrons are reflected, resulting in plasma ion assisted deposition (PIAD). Plasma ion momentum transfer per deposited atom was varied by the deposition rate, plasma bias voltage, plasma ion flux, and ion mass based on Eq. (3). During the film deposition, oxygen gas was directly introduced into the vacuum chamber (4~12 sccm) for chemically reactive deposition, whereas argon (10~20 sccm) was used as a working gas for the plasma source. The typical deposition rate and bias voltage range from 0.02 nm/sec to 0.25 nm/s and from 100V to 140V, respectively. XRD results further confirm that an amorphous film structure is obtained, which enables one to deposit mirror multilayers without increasing surface and interface roughness. FIG. 8 plots the XRD pattern of the 196 nm MgAl$_2$O$_4$ film after subtracting the background of SiO$_2$ substrate. The FIG. 8 XRD pattern clearly indicates that the MgAl$_2$O$_4$ film is amorphous. FIG. 9 plots the XRD pattern of the raw MgAl$_2$O$_4$ spinel crystal material which was used for electron beam evaporation. The diffraction peaks shown in FIG. 9 fit that of the MgAl$_2$O$_4$ spinel structure. The result of the comparison of the FIGS. 8 and 9 confirms that the modified PIAD process enables one to deposit amorphous MgAl$_2$O$_4$ films, even when the starting material is highly crystalline. The ability to form a dense and amorphous MgAl$_2$O$_4$ film allows one to deposit MgAl$_2$O$_4$—SiO$_2$ multilayers that have a smooth surface and interfaces. As a result of the ability to deposit such dense, amorphous and smooth layers the scatter loss of the MgAl$_2$O$_4$—SiO$_2$ based mirror is ignorable at 193 nm. As a result of the foregoing, at this point a broad bandwidth has been established by the $MgAl_2O_4$—$SiO_2$ multilayer structure.

Figure 10:
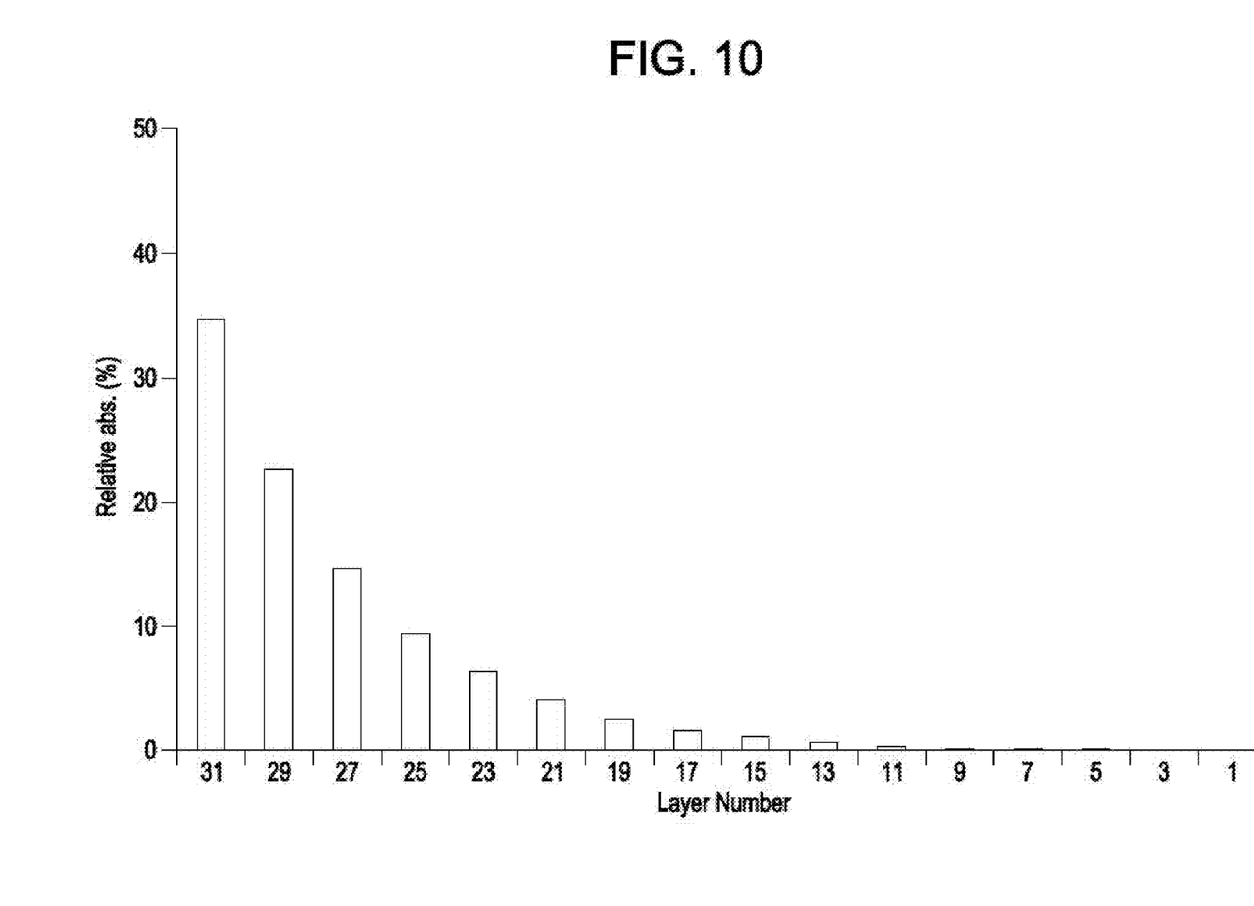
FIG. 10 is as a bar chart illustrating the relative absorption distribution of $MgAl_2O_4$—$SiO_2$ mirrors having different layer numbers.

Reduce Absorption of the Outermost $MgAl_2O_4$ Layers by Fluoride Multilayer Enhancement Because of the limitation of the bandgap of $MgAl_2O_4$, there is a small amount of absorption presented in the amorphous $MgAl_2O_4$ film at 193 nm. The extinction coefficient of the amorphous film is ~0.01 at 193 nm, which is determined by a variable angle spectroscopic ellipsometry. FIG. 10 plots the relative absorption distribution of an $MgAl_2O_4$—$SiO_2$ based mirror as a function of layer number. As FIG. 10 shows, the absorption increases sharply for the $MgAl_2O_4$ layers close to the mirror-air interface, where layer 1 represents the innermost layer that is closest to the substrate and layer 31 is the outermost or top layer of $MgAl_2O_4$. However, it was found that $MgAl_2O_4$ stack adsorption could be reduced by adding at least one stack of a plurality of metal fluoride layers to the top of the $MgAl_2O_4$—$SiO_2$ stack of layers. Since fluorides have relatively wider energy bandgap than the oxides, a solution to reduce the absorption is to add fluoride stack on top of the oxide stack.

Figure 11:
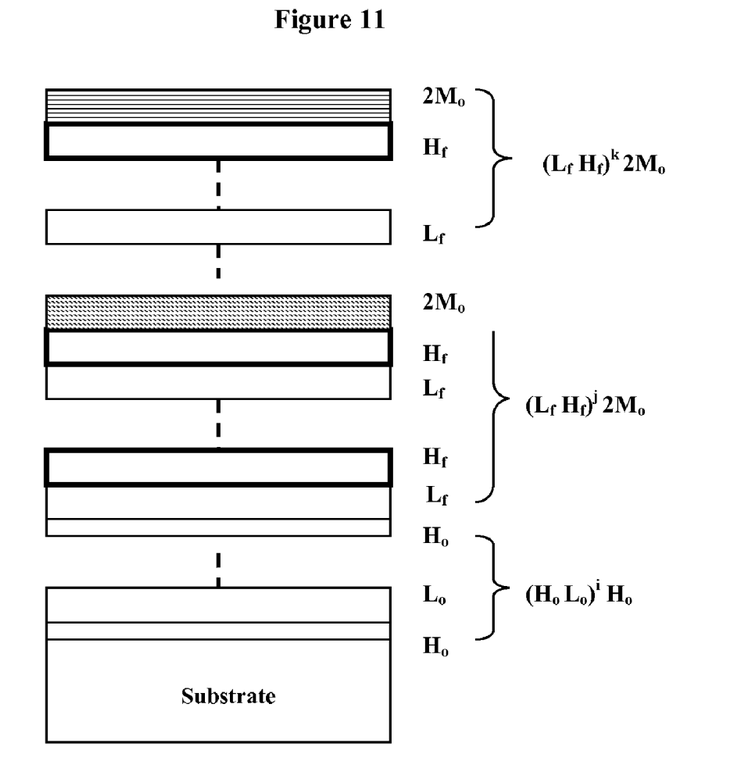
FIG. 11 is a schematic diagram of an oxide-smoothed and fluoride-enhanced oxide mirror.

It is known that the surface roughness of thermal evaporated fluoride multilayer depends on fluoride materials, deposition parameters, substrate types and surface conditions. For the fluoride enhancing oxide approach, the oxide absorption reduces with the increase of the fluoride enhancement. In the mean time, the enhanced mirror surface becomes rough as fluoride layer number and thickness increase, leading to a high scatter loss at 193 nm. The solution to eliminate scatter loss of the fluoride multilayer is to use a set of partial or reversed masks during the deposition of the fluoride multilayer enhancement and to insert dense smooth $SiO_2$ layer with the in-situ plasma smoothing process between the fluoride stacks. After buffering the fluoride film structure and smoothing out the existing surface, the fluoride enhancing approach can be resumed. This repeated fluoride enhancing and $SiO_2$ smoothing approach can be described in a formula of $$(H_oL_o)^i H_o (L_f H_f)^j 2M_o \ldots (L_f H_f)^k 2M_o \quad (4)$$

or $$(H_oL_o)^i H_f (L_f H_f)^j 2M_o \ldots H_f (L_f H_f)^k 2M_o \quad (5)$$

where $H_o$ and $L_o$ correspond to a quarter-wave high index $MgAl_2O_4$ and low index $SiO_2$, respectively. $2M_o$ represents a half-wave $SiO_2$ layer. $H_f$ and $L_f$ are the high index and low refractive index fluoride layers, respectively. A schematic of the oxide-smoothed and fluoride-enhanced oxide mirror is shown in FIG. 11. $L_f$ materials have a low refractive index in the range of 1.30 to 1.45 and $H_f$ is a high refractive index material having a refractive index in the range of 1.60 to 1.75. Examples, without limitation, of $L_f$ include alkaline earth metal fluorides ($CaF_2$, $BaF_2$, $MgF_2$, and $SrF_2$) and $AlF_3$. $MgF_2$ is the preferred alkaline earth metal fluoride. Examples, without limitation, of $H_f$ include lanthanide series metal fluoride ($LaF_3$, $GdF_3$, $PrF_3$, $NdF_3$, $PmF_3$, $SmF_3$, $EuF_3$, $DyF_3$, $HoF_3$, etc.) $LaF_3$ and $GdF_3$ are the preferred lanthanide metal fluorides. Comparing the stacks $(H_fL_f)^j$ and $(H_fL_f)^k$, $H_f$ and $L_f$ in the two stacks can be the same or different. That is, comparing the stack j to the stack k:

(a) $L_f$ and $H_f$ are the same in both stacks;
(b) $L_f$ is the same in both stacks and $H_f$ is different;
(c) $L_f$ is different and $H_f$ is the same is both stacks; and
(d) $L_f$ and $H_f$ are both different in the two stacks, Thus, as an example using $AlF_3$ and $MgF_2$ as the $L_f$ materials, and $LaF_3$ and $GdF_3$ as the high index materials, (a), (b) (c) and (d) can be:

(a) $(H_fL_f)^j = (LaF_3\ AlF_3)^j$ and $(H_fL_f)^k = (LaF_3\ AlF_3)^k$;
(b) $(H_fL_f)^j = (LaF_3\ AlF_3)^j$ and $(H_fL_f)^k = (GdF_3\ AlF_3)^k$;
(c) $(H_fL_f)^j = (LaF_3\ AlF_3)^j$ and $(H_fL_f)^k = (LaF_3\ MgF_2)^k$; and
(d) $(H_fL_f)^j = (LaF_3\ AlF_3)^j$ and $(H_fL_f)^k = (GdF_3\ MgF_2)^k$.

In addition, $2M_o$ can be the same or different in the two stacks. For example, in both stack j and stack k $2M_o$ is $SiO_2$, or in stack j $2M_o$ is $SiO_2$ and in stack k $2M_0$ is F-doped $SiO_2$.

Figure 12:
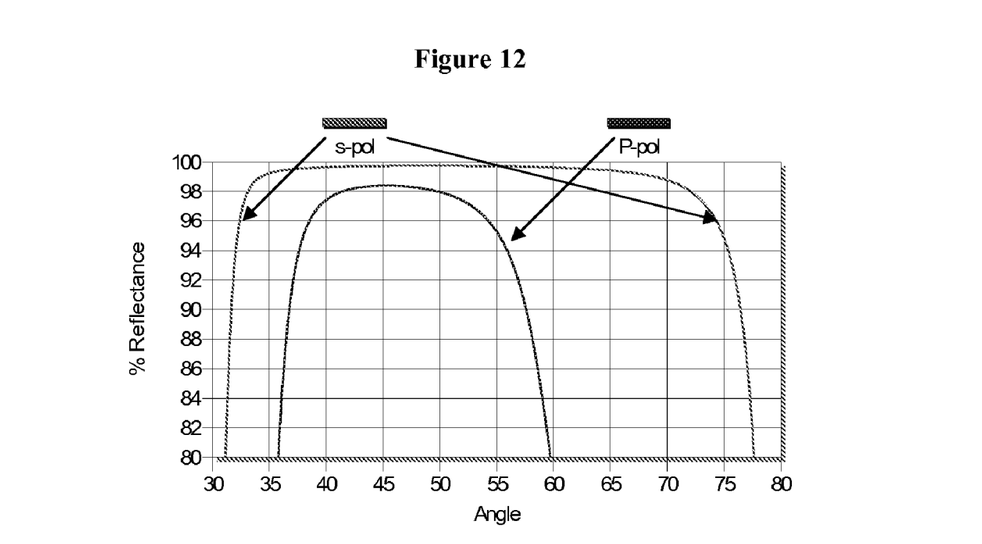
FIG. 12 is a graph illustrating the angular reflectance of an oxide-smoothed and fluoride-enhanced oxide mirror at 193 nm.

It is worthwhile to note that the a dense smooth $SiO_2$ layer is located on the top of the fluoride enhanced oxide mirror as described in formula (4) and (5). This $SiO_2$ layer isolates the fluoride stack from the environment and extends the lifetime of the optics. FIG. 12 shows the angular reflectance of an oxide-smoothed and fluoride-enhanced oxide mirror at 193 nm.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. An optical element comprising a selected substrate and an amorphous coating of formula $(H_oL_o)^i H_o$ on said substrate,
   wherein
   $(H_oL_o)^i$ is a stack of a plurality i of coating periods consisting of a $H_o$ layer and a $L_o$ layer on said substrate,
   i is in the range of 14-20,
   $H_o$ is amorphous $MgAl_2O_4$ and
   $L_o$ is amorphous $SiO_2$,
   to thereby form an amorphous stack comprising alternating layers of amorphous $MgAl_2O_4$ and amorphous $SiO_2$ on said substrate, wherein the $H_o$ layer of the first period is in contact with the substrate.

2. The coating according to claim 1, wherein the thickness of the stack is in the range of 600 nm to 1200 nm.

3. The coating according to claim 1, the thickness of the stack is in the range of 860 nm to 1200 nm.

4. The optical element according to claim 1, wherein:
   said element is a mirror;
   said amorphous coating of formula $(H_oL_o)^i H_o$ has a thickness in the range of 860 nm to 1200 nm; and
   said substrate is selected from the group consisting of
   (a) alkaline earth metal fluoride single crystals,
   (b) silica, fused silica, and F-doped fused silica
   (c) aluminum, titanium, Si and $Si_3N_4$, and
   (d) silica, fused silica, and F-doped fused silica, each of which has a metallic coating thereon.

5. The optical element according to claim 4, wherein said element further comprises a capping coating of an amorphous material selected from the group consisting of amorphous $SiO_2$, F-doped $SiO_2$ and fused silica, said capping coating being on top of said $(H_oL_o)^i H_o$ coating.

6. The optical element according to claim 1, wherein the substrate is an alkaline earth metal fluoride single crystal substrate, the thickness of the amorphous $(H_oL_o)^i H_o$ coating is in the range of 860 nm to 1200 nm, and a capping coating of an amorphous material selected from the group consisting of amorphous $SiO_2$, F-doped $SiO_2$ and fused silica is placed on top of said amorphous $(H_oL_o)^i H_o$.

7. The optical element according to claim 6, wherein said substrate is $CaF_2$.

8. An optical element consisting of:
   a selected substrate having a first coating having a formula $(H_oL_o)^i H_o$, a second coating of formula $(L_f H_f)^j 2M_o$ on top of said first coating, and a third coating of formula $(L_fH_f)^k 2M_o$ on top of said second coating;

wherein $(H_oL_o)^i$ is a stack consisting of a plurality i of periods $H_oL_o$ on said substrate, i is in the range of 14-20, $H_o$ is amorphous $MgAl_2O_4$, $L_o$ is amorphous $SiO_2$ and the $H_o$ layer of the first period is in contact with the substrate; and $(L_fH_f)^j$ is a stack formed on top of $(H_oL_o)^iH_o$ and is a plurality j of periods $L_fH_f$ formed by alternating layers where $L_f$ is the first layer and $H_f$ is the second layer, j is an integer in the range of 2 to 6, and $2M_o$ is a coating on top of said $(L_fH_f)^j$ stack; and $(L_fH_f)^k$ is a stack formed on top of $(L_fH_f)^j 2M_o$ and is a plurality k of periods $L_fH_f$ formed by alternating layers where $L_f$ is the first layer and $H_f$ is the second layer, k is an integer in the range of 2 to 6 on top of said $(L_fH_f)^k$ coating, and a $2M_o$ is a coating on top of said $(L_fH_f)^k$ stack; and $L_f$ is a low refractive index metal fluoride and $H_f$ is a high refractive index metal fluoride, and $2M_o$ is an oxide material selected from the group consisting of silica, fused silica and F-doped fused silica.

9. The optical element according to claim 8, wherein:
said element is a mirror;
said substrate is selected from the group consisting of
 alkaline earth metal fluoride single crystals,
 silica, fused silica, and F-doped fused silica
 aluminum, titanium, Si and $Si_3N_4$, and
 silica, fused silica, and F-doped fused silica having a metallic coating thereon; and
said amorphous coating of formula $(H_oL_o)^iH_o$ has a thickness in the range of 860 nm to 1200 m.

10. The optical element according to claim 8, wherein:
the substrate is an alkaline earth metal fluoride single crystal substrate,
the thickness of the amorphous $(H_oL_o)^iH_o$ coating is in the range of 860 nm to 1200 nm;
in each layer of stacks $(L_fH_f)^j$ and $(L_fH_f)^k$, the thickness of $L_f$ is in the range of 30 nm to 50 nm and the thickness of $H_f$ is in the range of 20-40 nm, and the thickness of the stacks is in the range of 140 nm to 420 nm.

11. The optical element according to claim 10, wherein the optical element is a mirror and the substrate is $CaF_2$.

12. An optical element comprising of:
a selected substrate having a first coating of formula $(H_oL_o)^i H_o$, a second coating of formula $(L_fH_f)^j 2M_o$ on top of said first coating, and a third coating of formula $H_f(L_fH_f)^k 2M_o$ on top of said second coating;

wherein $(H_oL_o)^i$ is a stack consisting of a plurality i of coating periods $H_oL_o$ on said substrate, i is in the range of 14-20, $H_o$ is amorphous $MgAl_2O_4$, $L_o$ is amorphous $SiO_2$ and the $H_o$ layer of the first period is in contact with the substrate; and $(L_fH_f)^j$ is a stack formed on top of $(H_oL_o)^iH_o$ and is a plurality j of periods $L_fH_f$ formed by alternating layers where $L_f$ is the first layer and $H_f$ is the second layer, j is an integer in the range of 2 to 6, and $2M_o$ is a coating on top of said $(L_fH_f)^j$ stack;

$H_f$ is a first high refractive index metal fluoride layer formed on top of the second coating, and $(L_fH_f)^k$ is a stack, formed on top of said first high refractive index layer $H_f$, of a plurality k of periods $L_fH_f$ formed by alternating layers where $L_f$ is the first layer and $H_f$ is the second layer, k is an integer in the range of 2 to 6, and a $2M_o$ is a coating on top of said $(L_fH_f)^k$ stack; and wherein $L_f$ is a low refractive index metal fluoride and $H_f$ is a high refractive index metal fluoride, and $2M_o$ is an oxide material selected from the group consisting of silica, fused silica and F-doped fused silica.

13. The optical element according to claim 12, wherein:
said element is a mirror;
said substrate is selected from the group consisting of
 alkaline earth metal fluoride single crystals,
 silica, fused silica, and F-doped fused silica
 aluminum, titanium, Si and $Si_3N_4$, and
 silica, fused silica, and F-doped fused silica having a metallic coating thereon; and
said amorphous coating of formula $(H_oL_o)^iH_o$ has a thickness in the range of 860 nm to 1200 m.

14. The optical element according to claim 12, wherein the substrate is an alkaline earth metal fluoride single crystal substrate,
and the thickness of the amorphous $(H_oL_o)^iH_o$ coating is in the range of 860 nm to 1200 nm;
in each period of stacks $(L_fH_f)^j$ and $(L_fH_f)^k$, the thickness of $L_f$ is in the range of 30 nm to 50 nm and the thickness of $H_f$ is in the range of 20-40 nm, and the thickness of stacks is in the rage of 140 nm to 420 nm.

15. The optical element according to claim 14, wherein the optical element is a mirror and the substrate is $CaF_2$.

* * * * *